United States Patent Office 3,182,029
Patented May 4, 1965

3,182,029
POLYMERIC SALTS OF STYRYL DYES
Victor Fu-Hua Chu, East Brunswick, and Jacob Quentin Umberger, Holmdel, N.J., assignors to E. I. du Pont de Nemours and Company, Wilmington, Del., a corporation of Delaware
No Drawing. Filed June 29, 1959, Ser. No. 823,310
4 Claims. (Cl. 260—8)

This invention relates to a process for making water-insoluble styryl dyes of high molecular weight which are dispersible in aqueous organic colloid media and non-migratory in organic colloid layers. More particularly, it relates to such a process wherein such dyes are reacted with polyvinyl acetals of aldehydes containing sulfonic acid groups. The invention also relates to polymeric addition salts of water-insoluble styryl dyes with such acetals. It further relates to water-permeable colloid layers containing such dye salts and to their preparation.

An object of this invention is to provide a simple and dependable process for making water-insoluble styryl dyes dispersible in aqueous colloid solutions. Another object is to provide such a process which renders the dyes relatively non-diffusing in water permeable colloid layers of photographic elements. Yet another object is to provide such a process which utilizes economical polymeric acetals. A further object is to provide new styryl dye salts with hydroxyl polymers containing a plurality of unsubstituted —CH$_2$CHOH— groups and acetal groups containing sulfonic acid groups. Still other objects will be apparent from the foregoing description.

It has been found in accordance with this invention that water-insoluble styryl dyes of high molecular weight can be reacted with acetals of hydroxyl polymers containing a substantial amount of recurring intralinear

—CH$_2$CHOH— groups with aldehydes containing a sulfonic acid group to form polymeric dye salts which are dispersible in aqueous organic colloid solutions. The polymeric styryl dye salts, moreover, are relatively fast to diffusion in thin water-permeable colloid layers.

The styryl dyes so reacted come within the general formula:

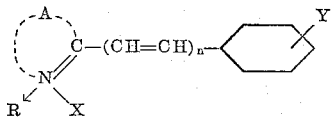

wherein R is an alkyl or aralkyl hydrocarbon radical having from 8 to 20 carbon atoms and preferably an alkyl group of 8–20 carbon atoms, X is the negative radical of an acid, A represents the atoms necessary to complete a mono-nuclear heterocyclic mononitrogen radical of the type used in the preparation of cyanine dyes taken from the class consisting of pyridine, thiazoline, oxazoline, and selenazoline, n is the integer 1 or 2 and Y is a substituent taken from the group consisting of OH, alkyl, alkoxy, methylenedioxy, alkylamino,

halogen, and nitro. R in the above formula, for example, may be octyl, dodecyl, tetradecyl, hexadecyl, octylphenoxyethyl, octadecyl, oleyl, etc., or R may be benzyl, menaphthyl or one of their methylene and polymethylene homologues containing 2 to 9 acyclic —CH$_2$— groups. Thus, the radical X may be a halide, e.g., chloride and bromide, and a paratoluene sulfonate, alkylsulfate chlorate or nitrate, and the radical Y may be methyl, ethyl, propyl, diethylamino, dimethylamino or ethylmethylamino.

Suitable acetals of the hydroxyl polymers include the polyvinyl acetals of orthosulfobenzaldehyde, alpha and beta sulfonaphthaldehydes, and beta-sulfopropionaldehyde, such as are described in U.S. 2,462,527; 2,609,290 and German patent 463,650 with completely or partially hydrolyzed polyvinyl esters, e.g., polyvinyl acetate. These polymers, which contain 45% to 90% intralinear

—CH$_2$CHOH— groups, have the advantage of being compatible with gelatin and can act as aco-binder therewith. They contain a large number of sulfonic acid groups per unit of weight and therefore they are able to maintain an excess of salt-forming groups or negative charge with respect to the styryl dye and with relatively small quantities of polymer as compared to monomeric hydrotropic or surface-active wetting agents having only one or two anionic groups. The small quantities of polymer required also have another important advantage. These small quantities permit the coating of extremely thin colloid layers having the same dye density as the thicker prior art layers which require much higher quantities of surfactants to disperse the styryl dyes.

In general, the water-insoluble dyes are dissolved in warm ethanol (or other appropriate solvent, i.e., methanol, acetone, etc.) and the resulting solution is poured into a warm solution of the polymeric mordanting compound. The polymer solution should contain some dye solvent and water. The warm aqueous solvent solution of the dye mordant salt is added slowly with stirring to an aqueous gelatin solution. The final coating composition is usually mainly water but it may contain up to about 30%, by weight, of solvent (ethanol, methanol, acetone, etc.). Usually a gelatin hardener is added and a surfactant of the neutral or compatible type to promote hardening and spreading, respectively.

The invention will now be illustrated in and by the following examples wherein all parts and percentages are by weight, unless otherwise indicated. The silver halide emulsions or dispersions are made and coated in the absence of actinic radiation which will expose the light-sensitive grains.

*Example I*

A colloid solution was prepared by first adding 20 g. of a 23% aqueous solution of a polyvinyl acetal formed by reacting polyvinyl alcohol with sodium benzaldehyde orthosulfonate as described in Example I of McQueen, U.S. Patent 2,462,527, to a solution composed of 125 ml. of ethanol, 50 ml. of distilled water and 50 ml. of acetone. The temperature was adjusted to 140° F. and there was admixed 34 ml. of a 6% ethanol solution of the dye:

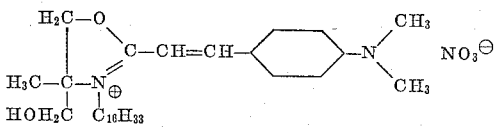

100 ml. of distilled water was added, then 200 g. of a 5% aqueous gelatin solution was slowly added. 8 ml. of a 5% aqueous solution of saponin was admixed with the resulting solution. The pH was adjusted to 6.0±0.1 with 0.1 N NaOH, and distilled water was added to bring the total weight to 800 grams. The resulting solution was coated between the blue and green sensitive gelatino-silver halide emulsion layers of a photographic color reversal film in an amount to give a coating weight of 1.4 mg. of dye per sq. decimeter and a density of approximately 1 at λ=450 mu. The color reversal film was exposed to an object image and processed in the following manner. All the treating solutions were used at a temperature of 75° F.

The film was treated for 12 minutes in a black and white developer having the following composition:

| | Grams |
|---|---|
| N-methyl p-aminophenol hydrosulfate | 1 |
| Sodium sulfite (anhydrous) | 60 |
| Hydroquinone | 10 |
| Sodium carbonate (1 $H_2O$) | 50 |
| Potassium bromide | 5 |

Water to make 1 liter.

The film was then treated for one minute in a short-stop solution of the following composition:

| | | |
|---|---|---|
| Potassium chrome alum | grams | 15 |
| Acetic acid, 28% | ml | 24 |

Water to make 1 liter.

The film was then rinsed for 3 minutes in water, and then flash exposed for 15 seconds on each side of the film at a distance of 2 feet from a high intensity incandescent lamp (e.g., an R–2 Photoflood lamp). The film was then treated for 20 minutes in a color developer having the following composition:

| | | |
|---|---|---|
| 4-amino-3-methyl-N-ethyl - N - (beta-methosulfonamidoethyl)-aniline | grams | 10 |
| Sodium sulfite (anhydrous) | do | 2 |
| Potassium bromide | do | 2 |
| Sodium carbonate·1 $H_2O$ | do | 47 |
| 3 N aqueous sodium hydroxide | ml | 35 |

Water to make 1 liter.
pH 11.8.

The film was then rinsed for 10 seconds in water and then immersed for 2 minutes in the chrome alum-acetic acid solution set forth above. The film was washed again in water for 4 minutes and then treated for 8 minutes in a hardening bleach bath having the following composition:

| | | |
|---|---|---|
| Potassium bichromate | grams | 10 |
| Potassium bromide | do | 20 |
| Ammonium bromide | do | 20 |
| Potassium alum | do | 40 |
| Acetic acid (glacial) | ml | 60 |
| Ammonium hydroxide (28–30% $NH_3$) | ml | 22 |

Water to make 1 liter.
pH 4.

The film was then rinsed in water for 3 minutes and then fixed for 3 minutes in a fixing solution having the following composition:

| | | |
|---|---|---|
| Sodium thiosulfate | grams | 200 |

Water to make 1 liter.

The film was then washed with water for 8 minutes immersed in a 0.5% aqueous solution of sodium dodecyl sulfate for 30 seconds and then dried. The resulting picture has good color quality due to the adequate discharge of the yellow filter dye in the alkaline developer solutions and due to the action of the yellow filter layer to prevent the recording of blue light in the green and red record emulsion layers. The resulting picture also had good resolution due to the advantageous thinness of the yellow filter layer. Also, this film exhibited good camera speed due to the complete immobilization of the yellow filter dye and exclusion of said dye from the adjacent emulsion layers. This complete immobilization was accomplished by the increase in molecular weight due to addition of the polyvinyl acetal salt forming radical and the mordanting action of said polyanion in said filter layer. The adequate discharge of the yellow filter dye is due in part to the instability of the oxazoline ring of the filter dye and to the fine dispersion resulting from the process of this invention.

*Example II*

The yellow styryl dye-polyvinyl acetal anion-gelatin composition of Example I was coated on a cellulose triacetate film support in an amount to give 25 mg. of composition per square decimeter and a dye density of approximately 1.8 at 450 m$\mu$. The coating was dried in a conventional manner. The resulting coating showed good clarity, i.e., freedom from dye precipitation and had an absorption maximum at about 445 m$\mu$. The film was immersed in a developer of the following composition:

| | Grams |
|---|---|
| Hydroquinone | 7.5 |
| N-methyl-p-aminophenol hydrosulfate | 5.0 |
| Sodium sulfite (anhydrous) | 60.0 |
| Sodium carbonate (anhydrous) | 50.0 |
| Potassium bromide | 4.5 |

Water to make 1 liter.

The film was then rinsed in water and dried. The color was found to be discharged and the film was clear and devoid of stain. Such film has no photographic sensitivity but serves as a convenient test of a filter composition prior to its use in a multilayer color film to determine clarity, dischargeability, density, etc.

*Example III*

A colloid solution was prepared by mixing in a solution of 420 ml. of 95% ethanol and 1345 ml. of distilled water, 1730 grams of 8% aqueous solution of a polyvinyl acetal containing approximately 20% of m-benzoylacetamidobenzaldehyde acetal groups and approximately 30% of o-sulfobenzaldehyde acetal groups as extralinear substituents. To this mixture there was added slowly with stirring 925 ml. of a 3% solution of the dye of Example I in ethanol. There was then added 833 grams of a 10% aqueous gelatin solution. The pH was adjusted to 5.8 and 159 ml. of a 5% aqueous solution of saponin and 34..3 ml. of a 10% aqueous solution of chrome alum were added. The pH was adjusted to 6.0 and the total weight was brought to 6300 grams with an aqueous ethyl alcohol solution (1 part 95% ethanol to 4 parts of water). The resulting solution was coated on a clear cellulose triacetate film support to give a total solids coating weight of 20 mg./dm.² The coated film was dried in a conventional manner and the resulting coating showed good clarity and had a density of 1.4 at the absorption maximum at about 450 m$\mu$. The color was discharged by bathing in the alkaline developer solutions described in Example I. The treated film showed complete and satisfactory discharge as would be desirable in normal color reversal processing.

*Example IV*

(A) Twenty grams of the dye:

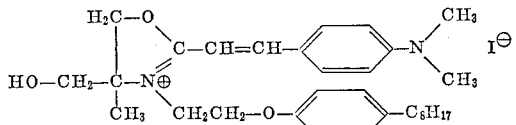

were dissolved in 650 ml. warm methanol.

(B) The above dye solution was added slowly with stirring to 6500 g. of the 23% aqueous polyanion solution of Example I to form a clear, non-turbid dispersion.

(C) To the mixture (B) above, there were added 650 g. of a 20% aqueous gelatin solution with stirring.

(D) The resulting finely dispersed dye solution was set overnight in a chilled room and then pressed through a perforated plate to form a readily washed gel in long filaments resembling "noodles." The yellow-colored noodles were washed in tap water at 55° F. for 5 minutes in each of ten water changes. The table indicates the physico-chemical characteristics of the filter composition before and after washing.

|  | Before Wash | After Wash |
|---|---|---|
| pH | 3.7 | 6.1 |
| pAg (silver wire vs. saturated calomel electrode) mv | −235 | −60 |
| Conductivity | 2,800 | 700 |
| Weight gms | 1,800 | 5,000 |

During the washing step, the iodide ions and other salts washed out as shown by the change in pAg and conductivity, respectively. However, no dye was washed out of the noodles even though dispersion was so fine as to yield clear, non-turbid yellow noodles.

Such dyed noodles were kept refrigerated and when needed were melted, and hardener and saponin wetting agent were added, and the resulting dispersion was coated in various cine color negative films and in color reversal films to function as the blue light absorbing element between the blue record emulsion and the red and green record emulsion layers beneath the filter layer. This filter layer was found to have the desirable property of being inert and serving only as a completely localized yellow filter. Without the mordant-dispersing polyanion, the dye could not be coated normally in finely dispersed form for best filter action and for best discharge in alkaline developers. The polyvinyl acetal of o-sulfobenzaldehyde used as the polymeric anionic mordant in the above examples analyzes about 4 to 5% sulfur by weight, i.e., the weight of the polymer containing one mol of sulfonate group, is in the range of 600 to 800 grams. The oxazolinium-styryl dye has an equivalent weight of about 500 grams. In many cases it was found that 2 grams of the above polymeric anion for each gram of dye provided about a 40% excess of polymer ion sites over the insoluble dye cations.

In place of the specific styryl dyes of the foregoing two detailed examples, one can obtain similar results by substituting in like manner equivalent amounts of any of such dyes disclosed above or in Middleton U.S. Patent 2,255,077. Similarly, in place of the specific polyvinyl acetals containing sulfonic acid groups of the foregoing detailed examples, there can be substituted equivalent amounts of any of the related polyvinyl acetals containing sulfonic acid groups that are disclosed in U.S. Patents 2,462,527, 2,609,290 and German Patent 463,650. The polyvinyl acetals containing sulfonic acid groups which are disclosed in the U.S. patents contain a large number of sulfonic acid groups. From 5% to 17% of the carbon atoms of the chain carbon atoms of the polyvinyl acetals contain acetal groups with the sulfonic acid groups.

In general, 1 to 10 parts by weight of the polyvinyl acetal sulfonic acid compound is used per part by weight of the styryl dye. Usually, a warm ethanol solution of the dye is admixed slowly and with stirring to the polyvinyl acetal sulfonic acid which also may be in warm aqueous ethanol solution whereby a good dispersion of the resulting high molecular weight dye salt is formed. Other suitable solvents include acetone, methanol, related solvents and mixtures thereof.

In making coating solutions the dispersion of the styryl dye salt just referred to can be added slowly to an aqueous solution of a water-permeable organic colloid for the desired filter layer. For instance, it is then added slowly with stirring to a warm aqueous gelatin solution. Because of the dispersing action of the polyvinyl acetal sulfonic acid component, the water-insoluble dye does not precipitate but remains well dispersed on dilution with the aqueous gelatin solution. In the absence of the polyvinyl acetal sulfonic acid component, the water-insoluble dye sometimes precipitates on addition of the alcoholic dye solution, particularly the dye of Example IV, to an aqueous gelatin or other colloid solution.

Various conventional bleaching solutions can be used in removing or discharging the polymeric styryl dye salts of the invention. For example, if the dichromate bleach bath of Example I should leave a slight residual yellow stain, such stain can be removed with a more vigorous bleach such as an aqueous bleach bath containing 60 g. potassium ferricyanide plus 20 g. potassium bromide per liter.

An advantage of the invention is that it is simple and effective. Another advantage is that the processes of mordanting the filter dyes of the invention utilize economical materials. A further advantage is that stable dispersions of styryl dyes in aqueous gelatin and similar colloids can be easily prepared. A still further advantage is that the novel filter layers are stable and the styryl dyes when combined with the polyvinyl acetal sulfonic acids do not migrate or diffuse, due to useful combination of the dye weighting and mordanting principles. Other advantages of the invention will be apparent to those skilled in the art.

What is claimed is:

1. Polymeric addition salts of (a) water-insoluble styryl dyes of the formula:

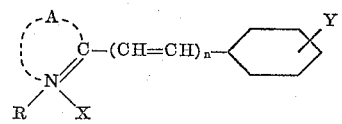

wherein R is a radical taken from the group consisting of alkyl and aralkyl radicals of 8–20 carbon atoms, X is the negative radical of an acid, Y is a member taken from the group consisting of hydroxyl, alkoxy, alkyl, methylenedioxy, alkylamino, dialkylamino, halogen and nitro in which the alkyl radicals contain 1–8 carbons and A is the atoms necessary to complete a heterocyclic mononitrogen ring selected from the class consisting of pyridine, thiazoline, oxazoline, and selenazoline rings, and $n$ is a positive integer from 1 to 2, with (b) an acetal of a hydroxyl polymer of high molecular weight containing a plurality of recurring intra-linear —$CH_2CHOH$— groups and an aldehyde containing a sulfonic acid group, 5–17% of the carbon atoms of the hydroxyl polymer containing the acetal groups with said sulfonic acid groups.

2. Polymeric addition salts according to claim 1 wherein said acetal is a sulfobenzaldehyde polyvinyl acetal.

3. A dispersion in an aqueous gelatin solution of a polymeric addition salt defined in claim 1.

4. A process for improving the dispersibility of water-insoluble styryl dyes which comprises admixing a styryl dye as defined in claim 1 with an aqueous solution of an acetal as defined in claim 1 and reacting said styryl dye with said acetal.

References Cited by the Examiner

UNITED STATES PATENTS

| 2,255,077 | 9/41 | Middleton | 260—240 |
| 2,280,253 | 4/42 | Muller et al. | 260—240.9 |
| 2,405,106 | 7/46 | Widmer et al. | 96—84 |
| 2,462,527 | 2/49 | McQueen | 96—84 |
| 2,494,032 | 1/50 | Brooker et al. | 260—240.9 |
| 2,639,282 | 5/53 | Sprague et al. | 260—240.9 |
| 2,750,291 | 6/56 | Tulagin | 96—84 |

MURRAY TILLMAN, Primary Examiner.

MILTON STERMAN, A. D. SULLIVAN, LEON J. BERCOVITZ, Examiners.